United States Patent
Plasse

(10) Patent No.: US 11,486,487 B2
(45) Date of Patent: Nov. 1, 2022

(54) GEARBOX WITH INTEGRATED SUBMERSIBLE LUBRICANT PUMP

(71) Applicant: Sikorsky Aircraft Corporation, Stratford, CT (US)

(72) Inventor: Bruce P. Plasse, Woodbridge, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 677 days.

(21) Appl. No.: 16/179,011

(22) Filed: Nov. 2, 2018

(65) Prior Publication Data

US 2020/0141482 A1    May 7, 2020

(51) Int. Cl.
| | | |
|---|---|---|
| *F16H 57/04* | (2010.01) | |
| *F16N 7/36* | (2006.01) | |
| *B64C 27/78* | (2006.01) | |
| *B64D 35/04* | (2006.01) | |

(Continued)

(52) U.S. Cl.
CPC ......... *F16H 57/0436* (2013.01); *B64D 35/04* (2013.01); *F16H 57/0404* (2013.01); *F16H 57/046* (2013.01); *F16H 57/0441* (2013.01); *F16H 57/0456* (2013.01); *F16H 57/0471* (2013.01); *F16N 7/366* (2013.01); *B64C 27/14* (2013.01); *B64C 27/78* (2013.01); *B64C 27/82* (2013.01)

(58) Field of Classification Search
CPC . F16N 7/36; F16N 7/366; B64C 27/78; F16H 57/0427; F16H 57/0441; F16H 57/0456; F16H 57/0436; F16H 57/0471
See application file for complete search history.

(56) References Cited

U.S. PATENT DOCUMENTS

| | | | |
|---|---|---|---|
| 1,920,326 A | | 8/1933 | Schuck et al. |
| 3,075,690 A | * | 1/1963 | Luenberger ......... F16H 57/0434 |
| | | | 415/182.1 |
| 3,786,901 A | | 1/1974 | Randell |

(Continued)

FOREIGN PATENT DOCUMENTS

| | | | | |
|---|---|---|---|---|
| EP | 2675707 B1 | | 9/2017 | |
| GB | 953485 A | | 3/1964 | |
| JP | 56024293 A | * | 3/1981 | ............. F16N 7/366 |

OTHER PUBLICATIONS

Extended European Search Report for European Application No. 19205355.1; Report dated Feb. 2, 2020; pp. 1-10.

*Primary Examiner* — Minh Truong
(74) *Attorney, Agent, or Firm* — Michael Best & Friedrich LLP

(57) ABSTRACT

A gear box includes a casing having an interior. A rotating component is arranged in the interior of the casing. A bearing including a rotating element, and a fixed element is connected with the casing in the interior. A submersible pump is arranged in the interior of the casing. The submersible pump includes a first housing portion extending about the rotating component fixedly mounted to the casing at the interior. A second housing portion is fixedly mounted to the casing at the interior and is aligned with the first housing portion. The first and second housing portions form a lubricant reservoir which holds lubricant. An impeller is mounted to the rotating component and arranged in the lubricant reservoir. One of the first and second housing portions includes an outlet through which the pumped lubricant is directed toward the rotating element.

19 Claims, 3 Drawing Sheets

(51) Int. Cl.
 *B64C 27/14* (2006.01)
 *B64C 27/82* (2006.01)

(56) References Cited

U.S. PATENT DOCUMENTS

| | | | | |
|---|---|---|---|---|
| 4,429,587 | A * | 2/1984 | Finn, III | F16H 57/0447 |
| | | | | 184/6.12 |
| 4,658,665 | A * | 4/1987 | Strinzel | F16H 57/0442 |
| | | | | 184/6.12 |
| 4,683,985 | A * | 8/1987 | Hultgren | F16H 57/0421 |
| | | | | 184/11.2 |
| 4,700,808 | A * | 10/1987 | Haentjens | F16C 33/6659 |
| | | | | 184/11.2 |
| 5,411,116 | A | 5/1995 | Kish et al. | |
| 6,446,755 | B1 * | 9/2002 | Varailhon | B64C 27/14 |
| | | | | 184/11.2 |
| 9,470,303 | B2 | 10/2016 | Mcpeak et al. | |
| 9,765,875 | B2 * | 9/2017 | Sheridan | F16H 57/0482 |
| 2014/0026702 | A1 * | 1/2014 | Sinusas | F16H 57/0409 |
| | | | | 74/467 |
| 2014/0030110 | A1 * | 1/2014 | Sinusas | F16H 57/0471 |
| | | | | 416/243 |
| 2017/0138461 | A1 | 5/2017 | Chory et al. | |
| 2017/0152935 | A1 | 6/2017 | Filter et al. | |
| 2017/0253328 | A1 * | 9/2017 | Wang | B64C 27/68 |

* cited by examiner

GEARBOX WITH INTEGRATED SUBMERSIBLE LUBRICANT PUMP

BACKGROUND

The subject matter disclosed herein generally relates to the art of vehicles and, more particularly, to a gear box having an integrated submersible pump for a vehicle.

Vehicles include gearboxes that may transfer energy from a prime mover into another system. In a rotorcraft, a main gearbox may transmit energy from the prime mover to a main rotor system. Rotorcraft may also possess a tail gearbox that transmits energy from the prime mover to a tail rotor assembly. Many gearboxes rely on centrifugal force generated by rotating components to splash lubricant onto bearings and other surfaces in need of lubricant. Other gearboxes may rely on external pumps.

Orientation changes and other factors may contribute to a lack or near lack of lubrication on one or more rotating components. Poor lubrication leads to heat generation and excessive wear and premature failure. External pumps should meet Federal Aviation Regulation (FAR) Oil-Out requirements, in addition they require space which is often lacking for various gearbox configuration, particularly tail rotor gearboxes. Replacing bearings and/or other rotating components is a costly endeavor leading to lengthy down times for the vehicle impacting the usage and profitability of the aircraft. Accordingly, it would be desirable to provide a lubrication system that would provide a flow of lubricant to a rotating component regardless of vehicle orientation without adding to an overall footprint of a gearbox. Further it would be desirable to design such a system that could be designed into new gearboxes or that could be kitted to drop-in to present configurations.

BRIEF DESCRIPTION

According to an embodiment, a gear box includes a casing having an interior. A rotating component is arranged in the interior of the casing. A bearing including a rotating element, and a fixed element is connected with the casing in the interior. A submersible pump is arranged in the interior of the casing. The submersible pump includes a first housing portion extending about the rotating component fixedly mounted to the casing at the interior. A second housing portion is fixedly mounted to the casing at the interior and is aligned with the first housing portion. The first and second housing portions form a lubricant reservoir which holds lubricant. An impeller is mounted to the rotating component and arranged in the lubricant reservoir. One of the first and second housing portions includes an outlet through which the pumped lubricant is directed toward the rotating element.

In addition to one or more of the features described above, or as an alternative, in further embodiments a nozzle extends from the one of the first and second housing portions, the nozzle having a first end arranged at the outlet and fluidically exposed to the lubricant reservoir and a second end directed toward the bearing and through which the pumped lubricant is directed toward the rotating element of the bearing.

In addition to one or more of the features described above, or as an alternative, in further embodiments a lubricant sump is arranged in the casing, the lubricant sump being fluidically connected with the lubricant reservoir.

In addition to one or more of the features described above, or as an alternative, in further embodiments a screen is arranged between the lubricant sump and the lubricant reservoir.

In addition to one or more of the features described above, or as an alternative, in further embodiments the rotating component comprises a pinion.

In addition to one or more of the features described above, or as an alternative, in further embodiments the bearing comprises a tail rotor pitch change shaft bearing.

According to another exemplary embodiment, a vehicle includes a body, a prime mover supported by the body, a rotating system mounted to the body, and a gearbox mechanically connected between the prime mover and the rotating system. The gearbox includes a casing having an interior. A rotating component is arranged in the interior of the casing. A bearing including a rotating element, and a fixed element is connected with the casing in the interior. A submersible pump is arranged in the interior of the casing. The submersible pump includes a first housing portion extending about the rotating component fixedly mounted to the casing at the interior. A second housing portion is fixedly mounted to the casing at the interior and is aligned with the first housing portion. The first and second housing portions form a lubricant reservoir which holds lubricant. An impeller is mounted to the rotating component and arranged in the lubricant reservoir. One of the first and second housing portions includes an outlet through which the pumped lubricant is directed toward the rotating element.

In addition to one or more of the features described above, or as an alternative, in further embodiments a nozzle extends from the one of the first and second housing portions, the nozzle having a first end arranged at the outlet and fluidically exposed to the lubricant reservoir and a second end directed toward the bearing and through which the pumped lubricant is directed toward the rotating element of the bearing.

In addition to one or more of the features described above, or as an alternative, in further embodiments a lubricant sump is arranged in the casing, the lubricant sump being fluidically connected with the lubricant reservoir.

In addition to one or more of the features described above, or as an alternative, in further embodiments a screen is arranged between the lubricant sump and the lubricant reservoir.

In addition to one or more of the features described above, or as an alternative, in further embodiments the rotating component comprises a pinion.

In addition to one or more of the features described above, or as an alternative, in further embodiments the pinion is rotatably supported in the casing through a first bearing and a second bearing, the submersible pump being arranged between the first and second bearings.

In addition to one or more of the features described above, or as an alternative, in further embodiments the bearing comprises a tail rotor pitch change shaft bearing.

In addition to one or more of the features described above, or as an alternative, in further embodiments the body comprises a fuselage of a rotorcraft.

In addition to one or more of the features described above, or as an alternative, in further embodiments the gearbox comprises a tail rotor gear box.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

DETAILED DESCRIPTION

Figure 1:
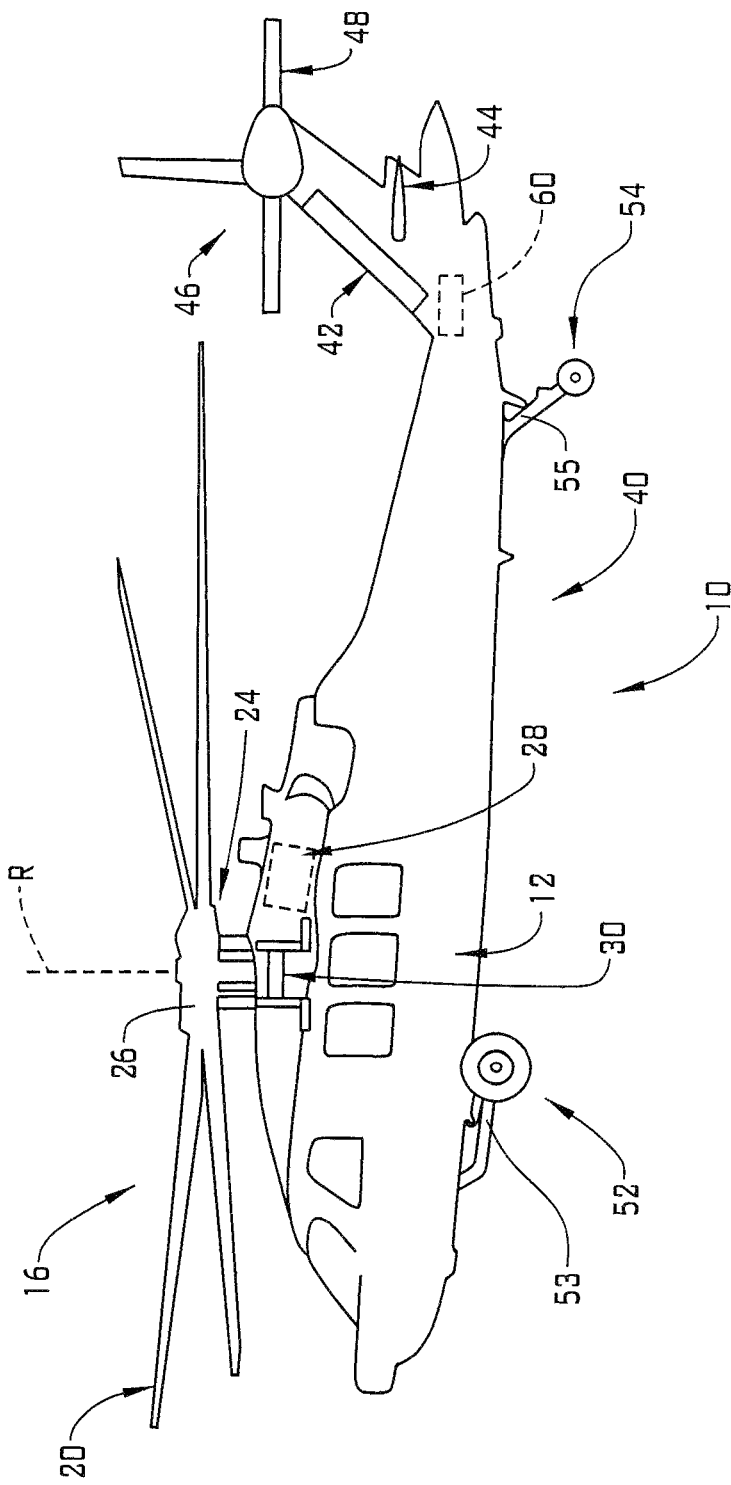
FIG. 1 depicts a rotary wing aircraft including a gearbox, in accordance with an aspect of an exemplary embodiment.
Figure 2:
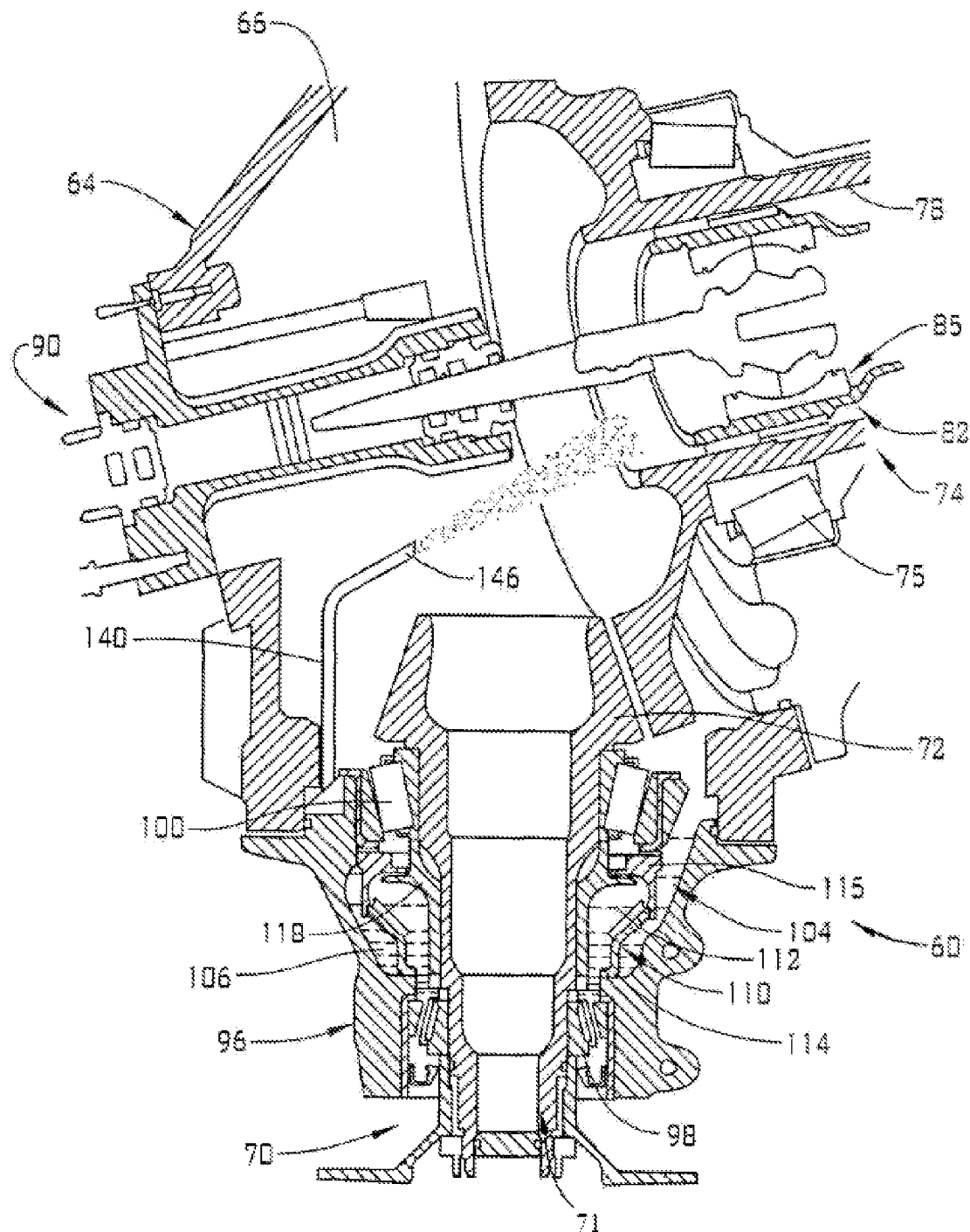
FIG. 2 depicts a partial cross-sectional view of the gearbox, in accordance with an aspect of an exemplary embodiment.

A vertical takeoff and landing (VTOL) or rotary wing aircraft, in accordance with an exemplary embodiment, is generally indicated at 10 in FIGS. 1 and 2. Rotary wing aircraft 10 including a fuselage 12 supported by an airframe 14. Rotary wing aircraft 10 includes a main rotor system 16, which rotates about a main rotor axis R. Main rotor system 16 includes a plurality of rotor blades 20 rotatable about a main rotor axis "R". Plurality of rotor blades 20 is mounted to a rotor hub 24 having a rotor head 26. Main rotor system 16 is driven by a gearbox 28 coupled to one or more prime movers, indicated generally at 30.

Rotary wing aircraft 10 includes an extending tail 40 that supports a vertical stabilizer 42 and a horizontal stabilizer or stabilator 44. A tail rotor system 46 including a plurality of tail rotor blades, indicated generally at 48 is mounted to vertical stabilizer 42. In the embodiment shown, tail rotor system 46 provides yaw control for rotary wing aircraft 10. Rotary wing aircraft 10 includes forward supports or landing gear, one of which is indicated at 52, that may be connected to a retractable or foldable support 53 arranged below a cabin portion (not separately labeled) of fuselage 12 and a rear support or wheel 52 that may be connected to a rear retractable or foldable support 55 supported at extending tail 40. At this point, it should be understood, that rotary wing aircraft 10 may take on various forms including dual rotor systems, pusher prop systems, and the like.

Tail rotor system 46 may be operatively coupled to gearbox 28 through a drive shaft (not shown) or through a system of drive shafts incorporating an intermediate gearbox (also not shown). More specifically, the drive shaft may extend from gearbox 28 to a tail gearbox 60. Referring to FIG. 2, tail gear box 60 includes a housing 64 having an interior 66. Housing 64 supports a first rotating component 70 that may take the form of an input shaft 71 having a a pinion gear 72 disposed thereon. Housing 64 also supports a second rotating component 74 that may take the form of an output shaft 74 that is coupled to tail rotor system 46. Output shaft 74 is rotatably supported in housing 64 through an output shaft bearing 75.

Output shaft 74 includes a hollow interior portion 78 that is receptive of a pitch change shaft 82 of tail rotor system 46. Pitch change shaft 82 is supported within hollow interior portion 78 through a pitch change shaft bearing 85 and may be selectively manipulated to change a pitch angle of tail rotor blades 48. More specifically, a pitch change member 90 is connected to pitch change shaft 82 and selectively manipulated through a rotorcraft control system (not shown) to apply yaw control inputs to rotorcraft 10 through tail rotor system 46.

Housing 64 includes an input shaft casing 96 that supports pinion gear 72 through a first bearing 98 and a second bearing 100. Input shaft casing 96 defines a lubricant sump 104 having a lubricant reservoir 106 that promotes lubrication of first and second bearings 98 and 100. A submersible pump 110 is arranged in lubricant sump 104. In an exemplary embodiment, submersible pump 110 is disposed between first bearing 98 and second bearing 100. It should be understood that the submersible pump 110 may be arranged in other locations in the sump 104 and should not be considered as being limited the particular location shown, e.g., between two bearings 98, 100. As will become evident herein, submersible pump 110 operates to deliver a flow of lubricant onto pitch change bearing 85. Of course, it should be understood, that submersible pump 110 may be configured to deliver a flow of lubricant onto other components either in conjunction with delivering lubricant to pitch change bearing 85 or as an alternative thereto. Submersible pump 110 is submerged in lubricant 112 within the sump 104.

Figure 3:
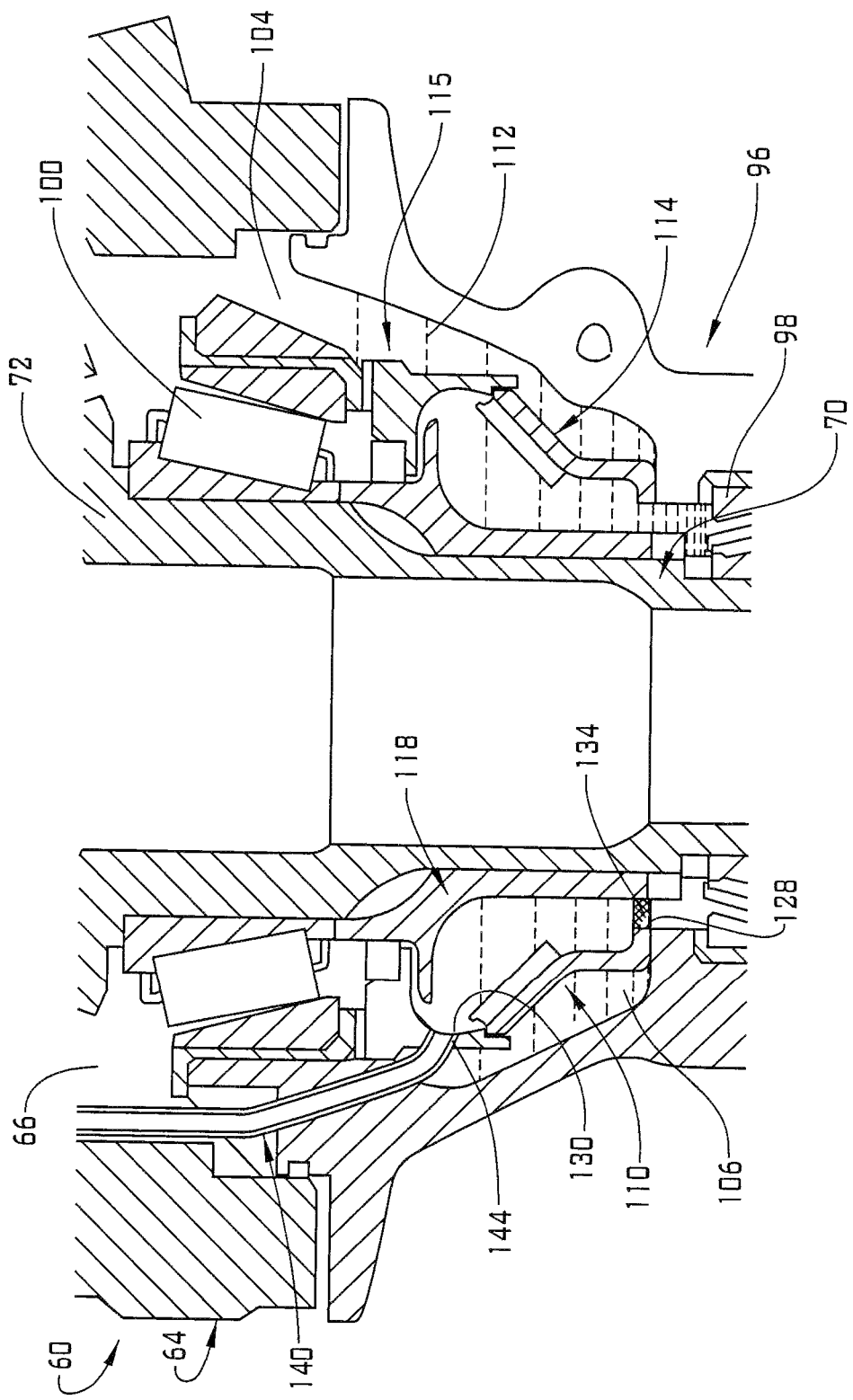
FIG. 3 depicts a detailed cross-sectional view of a portion of the gearbox of FIG. 2, in accordance with an aspect of an exemplary embodiment.

Referring to FIG. 3 and with continued reference to FIG. 2, submersible pump 110 includes a first housing portion 114 that aligns with a second housing portion 115 within input shaft casing 96. First and second housing portions 114 and 115 are rotatably fixed relative to input shaft casing 96. An impeller 118 is disposed within first and second housing portions 114 and 115 and fixedly connected with input shaft 72, which rotates relative to the housing portions 114, 115. In the exemplary embodiment shown, first housing portion 114 includes an inlet 128 and second housing portion 115 includes an outlet 130. A mesh screen 134 is be disposed at inlet 128 in the shown embodiment. Mesh screen 134 is configured to prevent any particles that could be entrained in lubricant residing in lubricant reservoir 106 from entering into submersible pump 110. However, it is understood that the mesh screen 134 need not be used in all aspects of the invention.

In accordance with an exemplary embodiment, submersible pump 110 supports a nozzle 140 that directs a flow of lubricant created by the rotation of the impeller 118 towards pitch change bearing 85. Nozzle 140 includes a first end 144 fluidically connected with housing outlet 130 and a second end 146 that is directed at pitch change bearing 85. As noted herein second or outlet end 146 may be directed at other components. Further, it should be understood that multiple nozzles could be employed to guide lubricant onto multiple components.

At this point it should be appreciated that the exemplary embodiments describe a gearbox that is capable of directing lubricant onto one or more components regardless of aircraft orientation. The use of a pump and a nozzle(s) that are directed to particular components ensures that those components are provided with a selected amount of lubricant to enhance an overall operational life and reduce maintenance costs.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A gearbox comprising:
a casing having an interior;
a first rotating component arranged in the interior of the casing and rotatable relative to the casing;
a first bearing and a second bearing rotatably supporting the first rotating component in the casing;
a second rotating component arranged in the interior of the casing and rotatable relative to the casing, the second rotating component positioned remotely from the first rotating component and at an angle relative to the first rotating component;
a third bearing including a rotating element and a fixed element, the third bearing rotatably supporting the second rotating component in the casing; and
a submersible pump arranged in the interior of the casing and between the first bearing and the second bearing, the submersible pump comprising:
a first housing portion extending about the first rotating component and fixedly mounted to the casing at the interior;
a second housing portion fixedly mounted to the casing at the interior and abutting with the first housing portion, the first and second housing portions forming a lubricant reservoir which holds lubricant, wherein
one of the first and second housing portions includes an outlet; and
an impeller mounted to the first rotating component and rotatable therewith, the impeller extending radially outward from the first rotating component and into the lubricant reservoir such that the impeller is radially spaced from the first and second housing portions and arranged in the lubricant reservoir to pump lubricant to the outlet according to the rotation of the first rotating component, wherein the pumped lubricant is directed from the outlet through the casing and toward the rotating element of the third bearing supporting the second rotating element.

2. The gearbox according to claim 1, further comprising: a nozzle extending from the one of the first and second housing portions, the nozzle having a first end arranged at the outlet and fluidically exposed to the lubricant reservoir and a second end directed toward the third bearing and through which the pumped lubricant is directed toward the rotating element of the third bearing.

3. The gearbox according to claim 1, further comprising: a lubricant sump arranged in the casing, the lubricant sump being fluidically connected with the lubricant reservoir.

4. The gearbox according to claim 3, further comprising: a screen disposed upstream of the pump.

5. The gearbox according to claim 1, wherein the third bearing comprises a tail rotor pitch change shaft bearing.

6. The gearbox of claim 1, wherein the impeller includes a free end positioned within the lubricant reservoir.

7. The gearbox according to claim 1, wherein the lubricant reservoir is stationary with the casing.

8. The gearbox according to claim 1, wherein the impeller is radially spaced from the outlet.

9. The gearbox according to claim 1, wherein one of the first and second housing portions includes an inlet positioned upstream of the outlet.

10. A vehicle comprising:
a body;
a prime mover supported by the body;
a rotating system mounted to the body; and
a gearbox mechanically connected between the prime mover and the rotating system, the gearbox comprising:
a casing having an interior;
an input shaft arranged in the interior of the casing and rotatable relative to the casing;
a first bearing and a second bearing rotatably supporting the input shaft in the casing;
a pitch change shaft arranged in the interior of the casing and rotatable relative to the casing, the pitch change shaft spaced apart from the input shaft and positioned at an angle relative to the input shaft;
a pitch change bearing remote from the input shaft, the pitch change bearing including a rotating element coupled to the pitch change shaft and a fixed element, the pitch change bearing rotatably supporting the pitch change shaft in the casing; and
a submersible pump arranged in the interior of the casing and between the first bearing and the second bearing, the submersible pump comprising:
a first housing portion extending about the input shaft and fixedly mounted to the casing at the interior;
a second housing portion fixedly mounted to the casing at the interior and abutting with the first housing portion, the first and second housing portions forming a lubricant reservoir which holds lubricant, wherein
one of the first and second housing portions defines an outlet for the lubricant reservoir; and
an impeller mounted to the input shaft and rotatable therewith, the impeller extending radially outward from the input shaft and into the lubricant reservoir such that the impeller is radially spaced from the first and second housing portions and arranged in the lubricant reservoir to pump lubricant to the outlet according to the rotation of the input shaft, wherein the pumped lubricant is directed from the outlet, through the casing, and toward the rotating element of the pitch change bearing.

11. The vehicle according to claim 10, further comprising: a nozzle extending from the one of the first and second housing portions, the nozzle having a first end arranged at the outlet and fluidically exposed to the lubricant reservoir and a second end directed toward the pitch change bearing and through which the pumped lubricant is directed toward the rotating element of the pitch change bearing.

12. The vehicle according to claim 10, further comprising: a lubricant sump arranged in the casing, the lubricant sump being fluidically connected with the lubricant reservoir.

13. The vehicle according to claim 12, further comprising: a screen disposed upstream of the pump.

14. The vehicle according to claim 10, wherein the pitch change bearing comprises a tail rotor pitch change shaft bearing.

15. The vehicle according to claim 10, wherein the body comprises a fuselage of a rotorcraft.

16. The vehicle according to claim 15, wherein the gearbox comprises a tail rotor gear box.

17. The vehicle according to claim 10, wherein the lubricant reservoir is stationary with the casing.

18. The vehicle according to claim 10, wherein the impeller is radially spaced from the outlet.

19. The vehicle according to claim 10, wherein one of the first and second housing portions defines an inlet for the lubricant reservoir positioned upstream of the outlet.

* * * * *